United States Patent
Kurosu et al.

(10) Patent No.: US 6,485,370 B1
(45) Date of Patent: Nov. 26, 2002

(54) ARRANGEMENT FOR MOUNTING A TUBULAR ELASTOMERIC MEMBER ONTO A SHAFT MEMBER

(75) Inventors: Norikazu Kurosu; Toru Iiizumi, both of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 527 days.

(21) Appl. No.: 08/771,243

(22) Filed: Dec. 20, 1996

(30) Foreign Application Priority Data

Feb. 7, 1996 (JP) .............................. 8-045329

(51) Int. Cl.$^7$ ................................ F16F 7/104
(52) U.S. Cl. .................. 464/180; 188/379; 267/141
(58) Field of Search ................ 464/180, 179, 464/89, 175; 74/574; 188/378, 379; 267/136, 141, 153

(56) References Cited

U.S. PATENT DOCUMENTS

| | | | |
|---|---|---|---|
| 2,047,976 A | * 7/1936 | Lord | 464/89 X |
| 2,110,783 A | * 3/1938 | Welker | 464/89 X |
| 2,930,640 A | * 3/1960 | Davis et al. | 464/89 X |
| 2,971,356 A | * 2/1961 | Reuter et al. | 464/89 |
| 3,137,148 A | * 6/1964 | Kayser | 464/89 |
| 3,199,186 A | * 8/1965 | Simpson | 464/89 X |
| 4,041,730 A | * 8/1977 | Kress | 464/89 X |
| 4,178,811 A | * 12/1979 | Shepard | 464/89 X |
| 4,820,238 A | * 4/1989 | Uchida et al. | 464/175 X |
| 4,957,469 A | * 9/1990 | Zollinger | 464/175 |
| 5,051,105 A | * 9/1991 | Sugiura et al. | 464/175 |
| 5,056,763 A | * 10/1991 | Hamada et al. | 267/414 |
| 5,098,344 A | * 3/1992 | Zollinger | 464/175 |
| 5,558,580 A | * 9/1996 | Okyama | 464/175 |
| 5,593,144 A | * 1/1997 | Hammada et al. | 188/379 X |

FOREIGN PATENT DOCUMENTS

JP 4-34249 * 2/1992 ............ 464/91

* cited by examiner

Primary Examiner—Lynne H. Browne
Assistant Examiner—G. Binda
(74) Attorney, Agent, or Firm—Carrier, Blackman & Associates, P.C.; Joseph P. Carrier; William D. Blackman

(57) ABSTRACT

In an arrangement for mounting a tubular member, such as a part of a dynamic damper or a dust boot, made of elastomeric material onto a shaft member, an annular projection is formed integrally on the inner circumferential surface of the tubular sleeve member, and an endless band made of relatively rigid material such as steel is either insert molded in or fitted on the tubular sleeve member so as to surround the annular projection. The outer diameter of the shaft member is smaller than the inner diameter of the endless band, but is greater than the inner diameter of the annular projection. Therefore, the elastomeric tubular member can be firmly fitted onto a shaft easily and economically. Because the endless band can be made of a seamless solid ring or a welded ring, it is more reliable in use than conventional steel band fasteners. Since the endless band is uniform over its entire circumferential length, it is free from any rotational imbalance. Also, elimination of projecting parts which was inevitable in the conventional arrangement using steel band fasteners is beneficial as it reduces the chance of inadvertently catching or damaging any external object.

24 Claims, 6 Drawing Sheets

ARRANGEMENT FOR MOUNTING A TUBULAR ELASTOMERIC MEMBER ONTO A SHAFT MEMBER

TECHNICAL FIELD

The present invention relates to an arrangement for mounting a tubular member made of elastomeric material onto a shaft member. The tubular member may include, not exclusively, dynamic dampers which are, for instance, mounted on a vehicle drive shaft to eliminate any undesired rotational resonant condition of the drive shaft and rubber boots for protecting shaft couplings and other assemblies from moisture and dust.

BACKGROUND OF THE INVENTION

In motor vehicles, a dynamic damper is sometimes mounted on a drive shaft with the aim of reducing vibrations and noises during use, and may consist of an annular mass, and an elastomeric member in which the mass is insert molded to mount the annular mass on the drive shaft. For the purpose of protecting a shaft coupling of a drive shaft from moisture and dust, a bellows-type tubular boot is often used. Typically, these elastomeric members are attached to the drive shaft by fastening a steel band around the elastomeric member to secure it onto the outer surface of the drive shaft, and are prevented from both circumferential and axial movement relative to the drive shaft. Typically, a crimping arrangement or a threading arrangement is provided in the steel band to join the two ends the steel band. Sometimes, the outer surface of the drive shaft must be suitably machined so as to positively prevent any relative movement between the elastomeric tubular member and the drive shaft.

However, according to such conventional arrangements, because of the need for the work step of fastening the steel band, the assembly work process tends to be more complex than desired. The need for the steel band adds to the effort required to stock and maintain the component parts for both the assembly work and servicing. Also, the shaft rotates at a high speed, and any lack of rotational balance in the steel band could cause an increase in the noises and the vibrations which the drive shaft may produce.

BRIEF SUMMARY OF THE INVENTION

In view of such problems of the prior art, a primary object of the present invention is to provide an arrangement for mounting an elastomeric tubular member onto a shaft which is simple and easy to assemble, and low in cost.

A second object of the present invention is to provide an arrangement for mounting an elastomeric tubular member onto a shaft which is reliable in use, and is relatively free of any rotational imbalance.

According to a preferred embodiment of the present invention, these and other objects can be accomplished by providing an arrangement for mounting a tubular member made of elastomeric material onto a shaft member, comprising: a tubular sleeve member made of resiliently deformable elastomeric material and having an inner circumferential surface adapted to be fitted onto the shaft member; an annular projection formed integrally on the inner circumferential surface of the tubular sleeve member; and an endless band made of relatively rigid material which is disposed on the tubular sleeve member and coaxially surrounds the annular projection; an inner diameter of the annular projection being slightly smaller than an outer diameter of the shaft member, and an inner diameter of the endless band being slightly larger than the outer diameter of the shaft member.

Thus, an elastomeric tubular member can be fitted onto a shaft easily and economically. Because the endless band can be made of a seamless solid ring or a welded ring, it is more reliable in use than conventional steel band fasteners. Furthermore, since the endless band is uniform over its entire circumferential length, it is free from any rotational imbalance. Also, elimination of projecting parts which was inevitable in the conventional arrangement using steel band fasteners is beneficial as it reduces the chance of inadvertently catching or damaging any external object. The endless band may be either fitted onto the tubular sleeve member or insert molded in the tubular sleeve member. According to a preferred embodiment of the present invention, the annular projection is formed in an axial extension of the tubular sleeve member, and the endless band is adapted to be fitted onto or insert molded in the axial extension.

To facilitate the mounting of the sleeve member, the inner diameter of the tubular sleeve member may be substantially equal to the outer diameter of the shaft member, and/or at least one of axial ends of the annular projection may be provided with a tapered section. When the annular projection is formed in an axial extension of the tubular sleeve member, and the endless band is adapted to be fitted onto or insert molded in the axial extension, the axial extension of the tubular sleeve member may be provided with at least one axial slit to aid placement of the endless band onto the axial extension. Even when any sealing function is required, the annular projection which is necessarily tightly fitted around the shaft member ensures a favorable sealing capability. This arrangement is suited for application to dynamic dampers, and, in this case, the tubular sleeve member may be connected to an annular mass member which coaxially surrounds the sleeve member, via a radial rib made of resilient elastomeric material. Thus, the dynamic damper can be made by simply insert molding an endless band in a single-piece member made of suitable rubber-like elastomeric material.

According to another preferred embodiment of the present invention, the tubular sleeve member including the axial extension is provided with an inner circumferential surface having a uniform inner diameter, and the annular projection is formed by fitting the endless band having a slightly smaller inner diameter than an outer diameter of the axial extension onto the axial extension. This simplifies the molding of the tubular sleeve member, and may even allow use of a conventional tubular sleeve which was originally adapted for a steel band fastener. In this case also, the axial extension of the tubular sleeve member may be provided with at least one axial slit to aid placement of the endless band onto the axial extension.

Another important application of the present invention may be found in securing an axial end portion of a dust boot made of elastomeric material onto a shaft member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
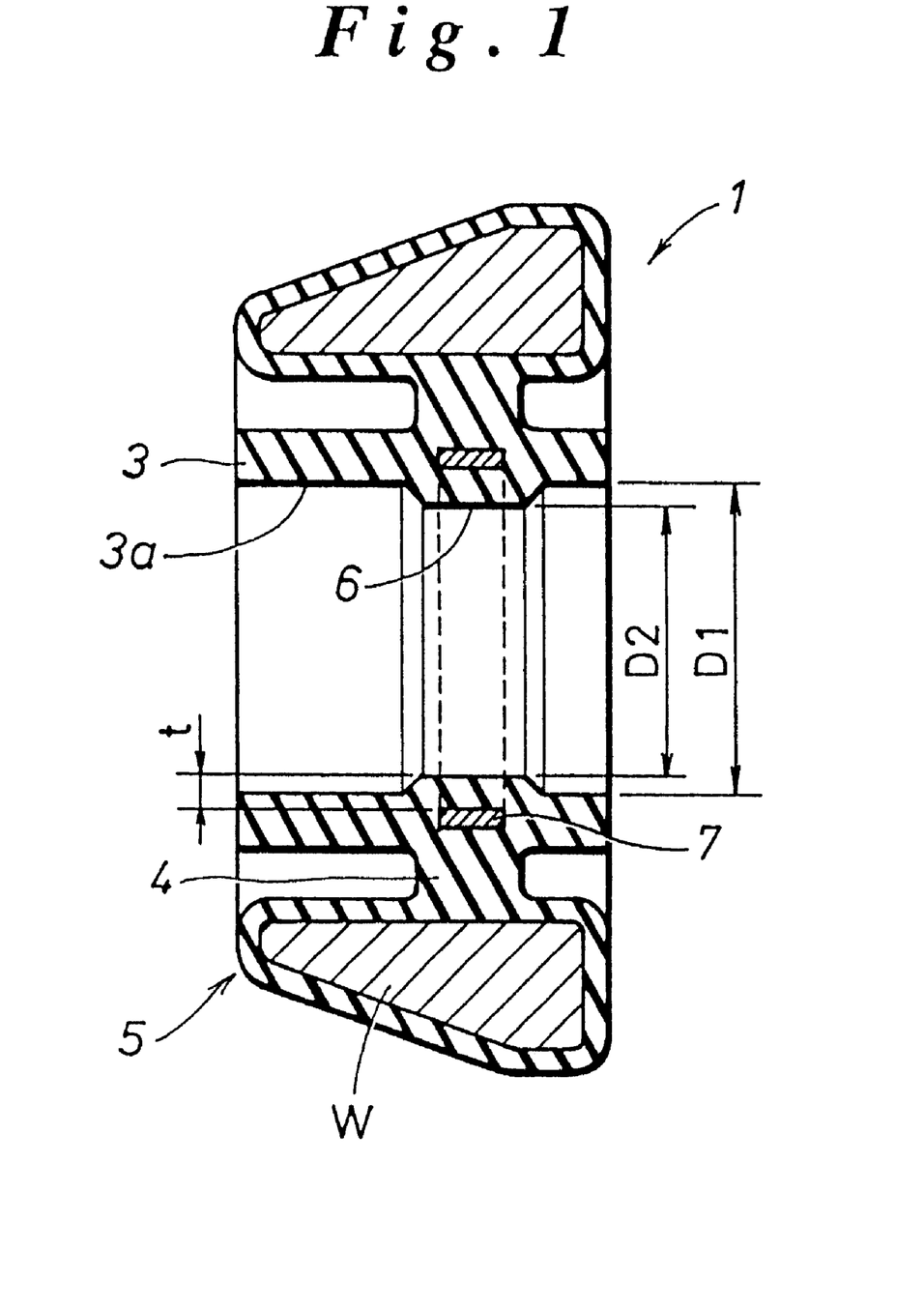
FIG. 1 is a sectional view of a dynamic damper constructed as a first embodiment of the present invention.
Figure 2:
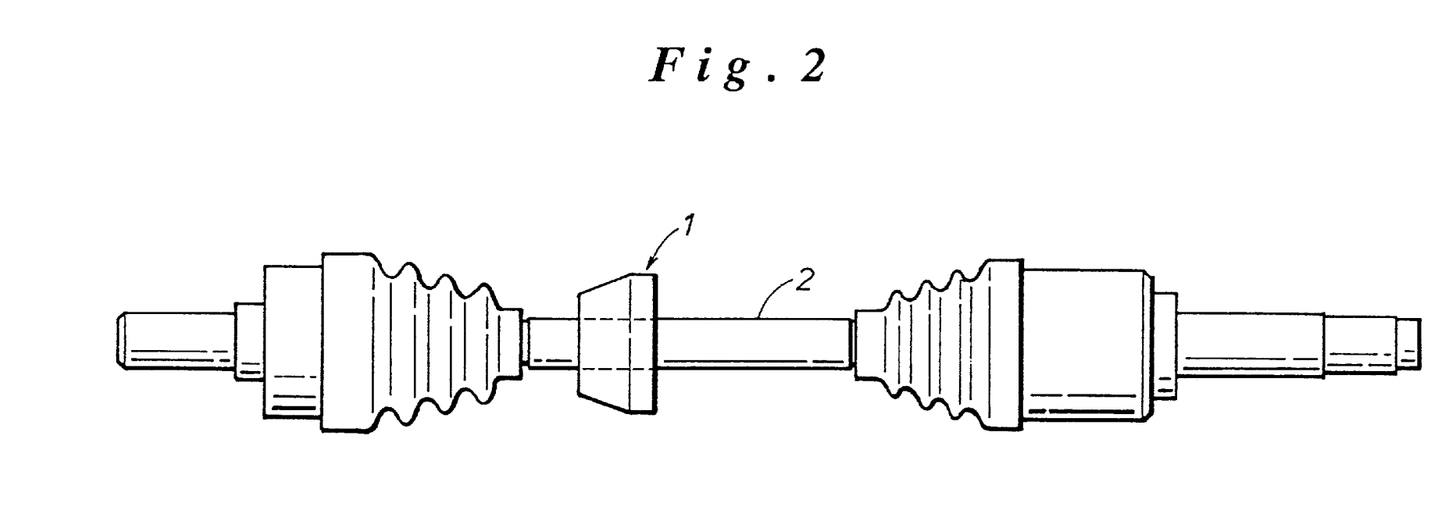
FIG. 2 is a side view of a drive shaft assembly which is incorporated with the dynamic damper of FIG. 1.

FIG. 1 shows a dynamic damper according to the present invention. This dynamic damper 1 is adapted to be coaxially mounted on an intermediate part of a drive shaft 2 as illustrated in FIG. 2, the drive shaft extending between a front wheel and an output end of a differential gear box which are not shown in the drawings. The dynamic damper 1 comprises a tubular sleeve member 3 and an annular flywheel member 5 which is coaxially attached to the sleeve member 3 via a radial rib 4. The sleeve member 3, as well as the radial rib 4, is made of rubber-like elastomeric material, and the same material covers the flywheel member 5. The flywheel member 5 is made of steel or other metallic material W to provide a mass of inertia.

More specifically, the entire assembly is made by insert molding the flywheel member 5 in the elastomeric material in a single molding process.

The inner circumferential surface 3a of the sleeve member 3 is coaxial with respect to the axial center of the assembly, and has a uniform diameter except for a radial inwardly directed, annular projection 6 provided on the inner circumferential surface of the sleeve potion 3. The annular projection 6 is also molded simultaneously and integrally with the rest of the part of the assembly made of the elastomeric material. The assembly further includes an endless ring 7 insert molded inside the part of the sleeve member 3 aligned with the annular projection 6. In this embodiment, the endless ring 7 is made by forming a strip of steel plate into a ring, and welding the opposing edges of the steel plate together.

This dynamic damper 1 is adapted to be press fitted onto the drive shaft 2. To this end, the inner diameter D1 of the inner circumferential surface 3a of the sleeve member 3 is substantially identical to the outer diameter of the drive shaft 2, and the annular projection 6 therefore defines an inner diameter D2 which is somewhat smaller than that of the remaining part of the sleeve member 3. The inner diameter of the endless ring 7 is somewhat larger than the inner diameter of the sleeve member 3. More specifically, a layer of elastomeric material having a thickness t is provided between the inner circumferential surface of the annular projection 6 and the inner circumferential surface of the endless ring 7. In this case, the annular projection 6 is provided with a trapezoidal cross section.

Therefore, when the dynamic damper 1 is fitted onto the drive shaft 2, the elastomeric material forming the radial annular projection 6 is compressed against the inner surface of the endless ring 7, and the end result is similar to what is accomplished by tightening a steel band around the sleeve member 3 against the outer surface of the drive shaft 2. Thus, the dynamic damper is firmly secured to the drive shaft 2 against movement both in the axial and circumferential directions.

Figure 3:
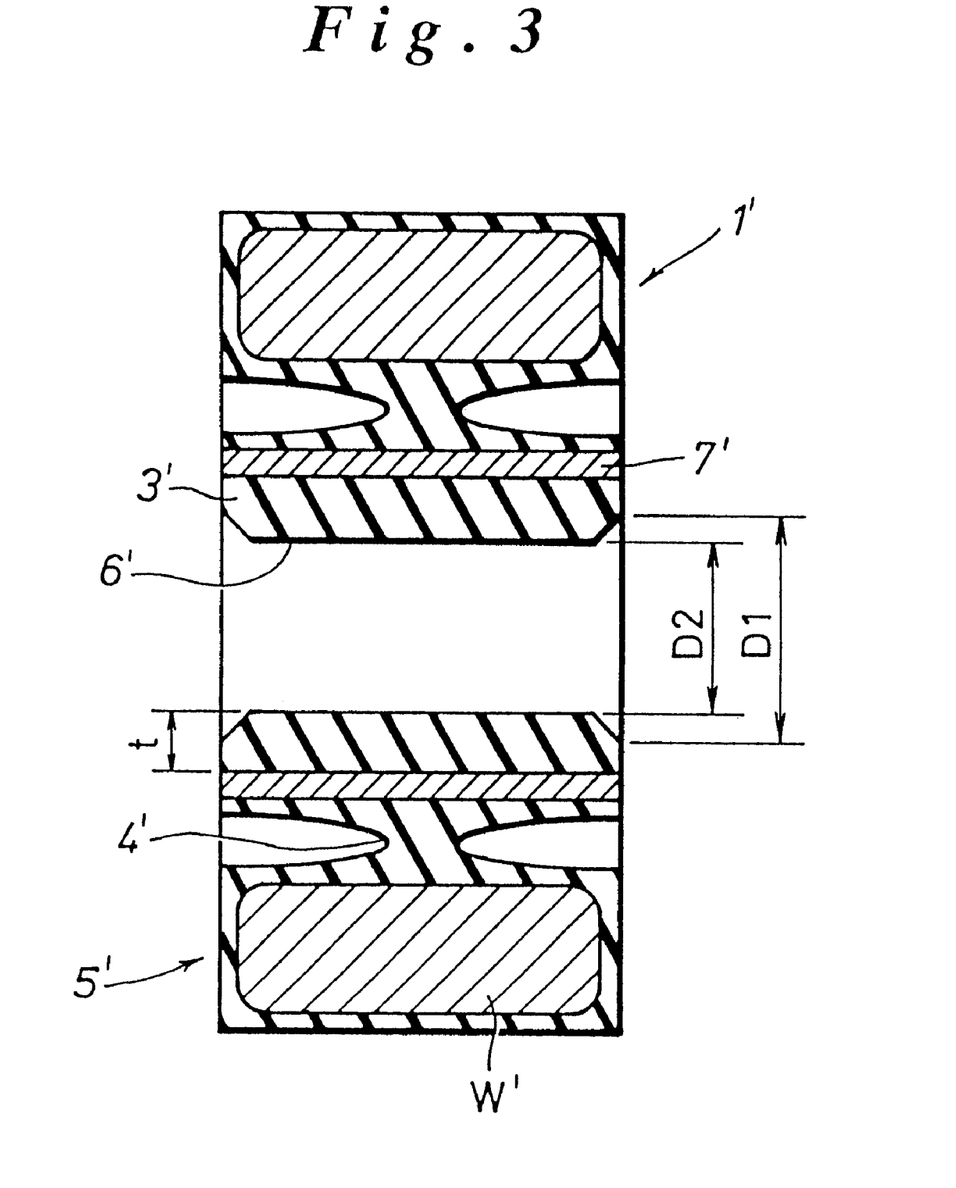
FIG. 3 is a view similar to FIG. 1 showing a second embodiment of the present invention.

FIG. 3 shows a second embodiment of the present invention also constructed as a dynamic damper, and the parts corresponding to those of FIG. 1 are denoted with like numerals. In this embodiment, the endless ring 7 extends substantially over the entire axial length of the sleeve member 3. The inner diameter D2 of the sleeve member 3 is somewhat smaller than the outer diameter D1 of the drive shaft onto which this dynamic damper is to be fitted. The inner circumferential surface of the sleeve member 3 is generally uniform over the entire axial length thereof, except for the tapered sections provided on either axial ends of the inner circumferential surface of the sleeve potion 3 to assist and guide the effort required to fit the dynamic damper onto the drive shaft.

In this case, the maximum inner diameter of the sleeve member 3 which is defined on each axial end of the inner circumferential surface of the sleeve potion 3 is substantially identical to the outer diameter of the drive shaft 2, and the inner diameter of the rest of the inner circumferential surface of the sleeve member 3 is somewhat smaller than the outer diameter of the drive shaft 2. In this regard, it can be said that the assembly includes an annular projection 6 having a width substantially extending over the entire axial length of the sleeve member 3.

In this case also, when the dynamic damper 1 is fitted onto the drive shaft 2, the elastomeric material of the annular projection 6 distributed over the inner circumferential surface of the endless ring 7 is compressed against the inner surface of the endless ring, and the end result is similar to what is accomplished by tightening a steel ring around the sleeve member 3 against the outer surface of the drive shaft. Thus, the dynamic damper is so tightly secured onto the drive shaft 2 that the dynamic damper is prevented from moving both in the axial and circumferential directions. To allow the elastomeric material to deform without creating any localized excessive stresses in the elastomeric material while achieving a favorable flow of the material, the inner circumferential surface of the sleeve potion 3 may be provided with axial and circumferential grooves as required.

Figure 4A:
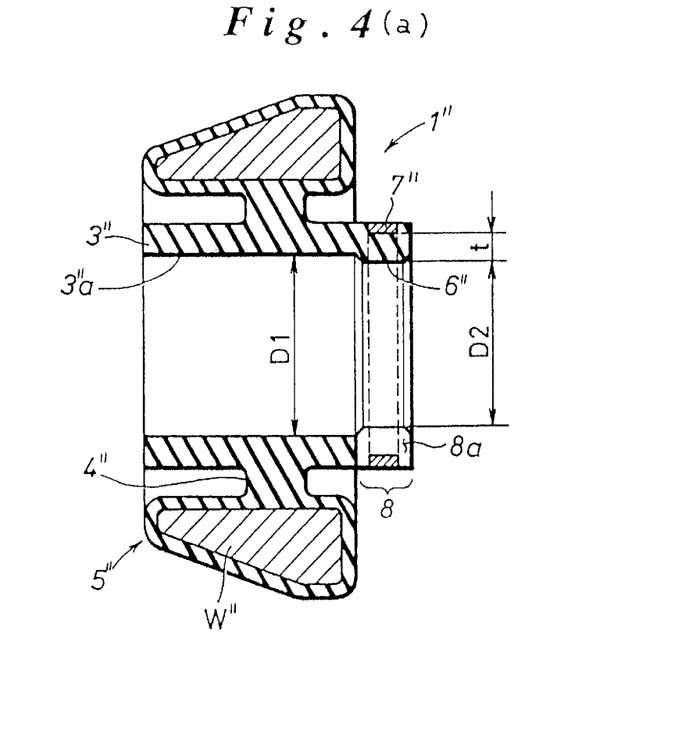
FIG. 4(a) is a view similar to FIG. 1 showing a third embodiment of the present invention.
Figure 4B:
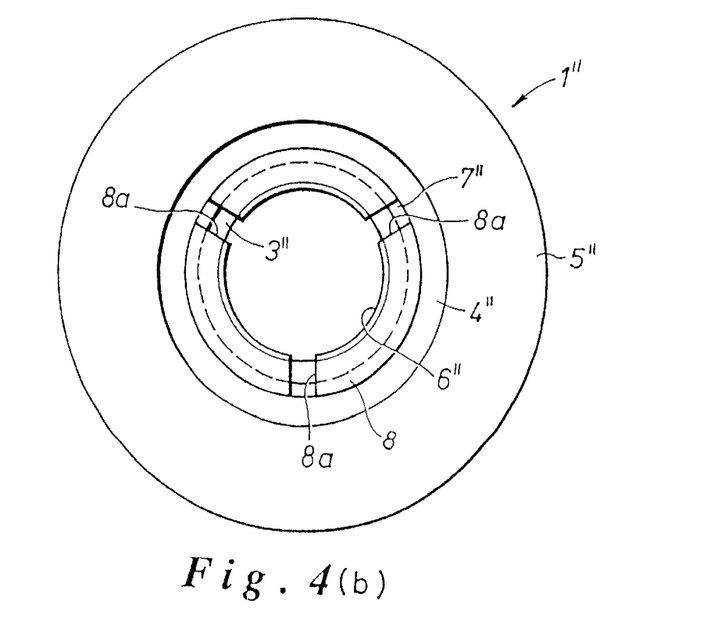
FIG. 4(b) is an end view of the dynamic damper of FIG. 4(a)

FIGS. 4(a) and 4(b) show a third embodiment of the present invention which is also constructed as a dynamic damper adapted to be fitted on a drive shaft, and the parts corresponding to those of the previous embodiments are denoted with like numerals. In this example, the sleeve member 3 is provided with an axial extension 8 which is provided with a radial annular projection 6 having an inner diameter D2 somewhat smaller than that D1 of the remaining part of the sleeve member 3. The outer surface of the axial extension 8 is provided with a groove which is adapted to receive an endless steel band 7 therein. The annular projection 6 is again provided with tapered sections on either axial end. The axial extension 8 is further provided with three longitudinal slits 8a which extend axially over the entire length of the extension 8, and are arranged at an equal interval circumferentially. The inner diameter of the endless steel band 7 is somewhat greater than the inner diameter D1 of the sleeve member 3 as indicated by the thickness t of the layer of elastomeric material interposed between the inner circumferential surface of the projection 6 and the inner circumferential surface of the endless steel band 7.

According to this embodiment, the endless steel band 7 is fitted onto the axial extension 8 of the tubular sleeve potion 3 with the aid of the slits 8a before the entire assembly is fitted onto a drive shaft, instead of insert molding the endless steel band within the damper.

Figure 5A:
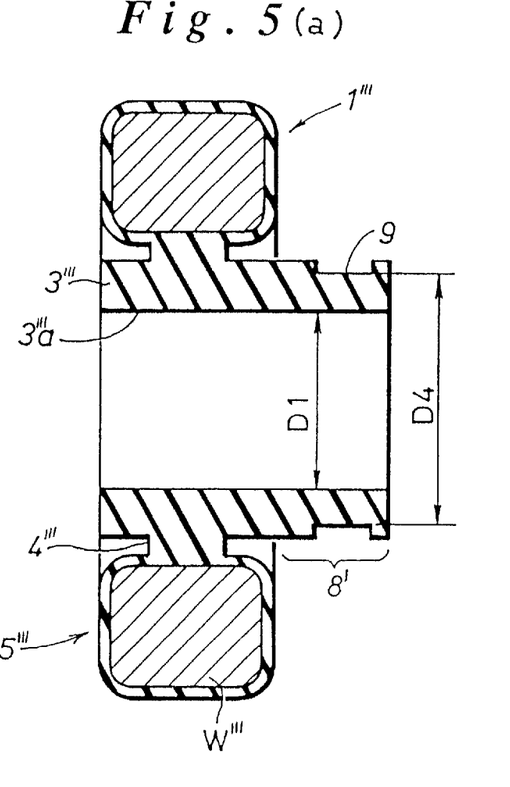
FIG. 5(a) is a view similar to FIG. 1 showing a fourth embodiment of the present invention.
Figure 5B:
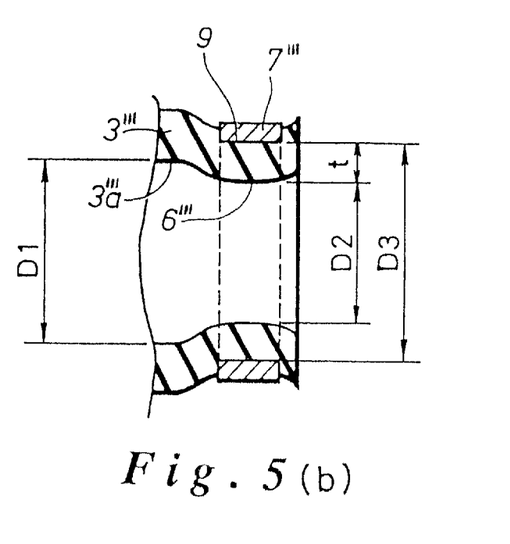
FIG. 5(b) is a fragmentary sectional view showing a part of the dynamic damper of FIG. 5(b) after the endless band is fitted on the axial extension.

FIGS. 5(a) and 5(b) show a fourth embodiment of the present invention, and the parts corresponding to those of the previous embodiments are denoted with like numerals. The tubular sleeve member 3 is provided with an axial extension 8, but in this embodiment, the inner diameter D1 of the axial extension 8 is substantially identical to that D1 of the remaining part of the tubular sleeve member when the tubular sleeve member 3 is initially molded. The outer circumferential surface of the axial extension 8 is provided with a groove 9 for receiving an endless steel band 7, and the groove 9 is provided with a relatively flat bottom surface defining an outer diameter D4. The inner diameter D3 of this endless steel band is somewhat greater than the inner diameter D1 of the sleeve member 3, but is smaller than the outer diameter D4 of the bottom of the groove 9 in which the endless steel band 7 is received. Therefore, when the endless steel band 7 is fitted onto the groove 9 of the axial extension 8 before fitting the assembly onto a drive shaft, the material of the axial extension 8 is compressed inwardly from radial directions, and the resulting deformation causes the inner diameter D2 of the axial extension 8 to be somewhat smaller than the outer diameter of the drive shaft. In other words, fitting the endless steel band 7 onto the axial extension 8 causes an equivalent of a radial annular projection to be formed in the inner circumferential surface of the axial projection 8. Thus, in this case also, the elastomeric material forming the radial annular projection is compressed against the inner surface of the endless ring, and the end result is similar to what is accomplished by tightening a steel ring around the sleeve member 3 against the outer surface of the drive shaft. Thus, the dynamic damper is fixedly secured to the drive shaft against movement both in the axial and circumferential directions.

According to this embodiment, the sleeve member including the axial extension may have a uniform inner diameter over its entire length before it is fitted with the steel band, it is possible to use, for carrying out the present invention, a conventional sleeve member adapted to be used in combination with a conventional steel band fastener. Also, a uniform inner diameter can simplify the die assembly for molding the sleeve member and the manufacturing cost can be reduced as compared to the case where an annular projection is provided in the inner circumferential surface of the sleeve member.

Figure 6:
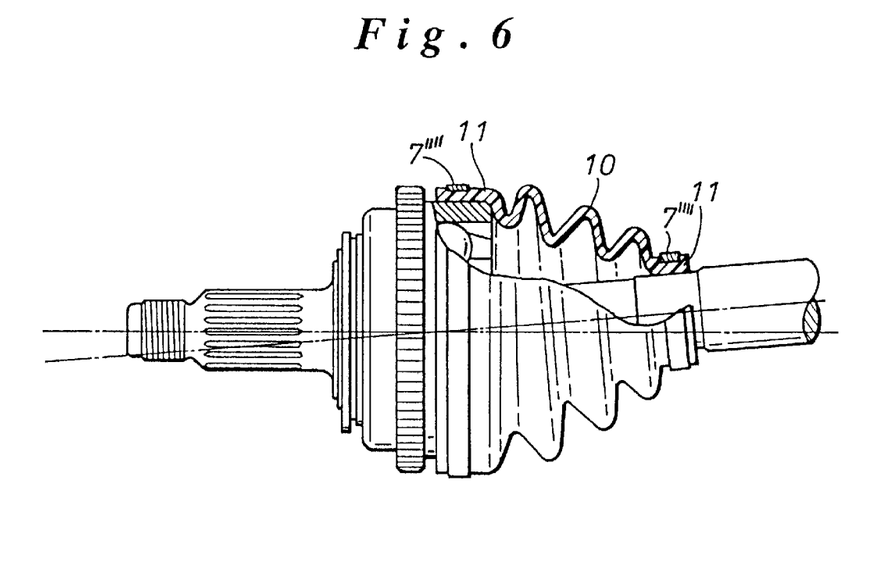
FIG. 6 is a partly broken away side view of a shaft coupling assembly incorporated with a rubber boot constructed as a fifth embodiment of the present invention.

The present invention is not limited in its application to the mounting of a dynamic damper, and can be also used for other applications. For instance, as illustrated in FIG. 6, the present invention may be applied to a rubber dust boot for protecting a shaft coupling connected between two drive shafts. The rubber dust boot comprises a bellows section 10, and a pair of tubular sleeve members 11 formed on either axial ends thereof. Additionally, an endless steel band 7 is insert molded in or fitted on each of the tubular sleeve members 11, and an annular projection similar to those shown in FIGS. 1 to 5(b) is formed on an inner circumferential surface thereof. As a matter of fact, the inventive features shown in the embodiments shown in FIGS. 1 to 5(b) can be directly applied to this embodiment.

Although the present invention has been described in terms of preferred embodiments thereof, it is obvious to a person skilled in the art that various alterations and modifications are possible without departing from the scope of the present invention which is set forth in the appended claims.

What we claim is:

1. An arrangement for mounting a tubular sleeve member made of elastomeric material onto a rotatable shaft member such that the tubular sleeve member is prevented from moving in radial and axial directions relative to the shaft member, the arrangement comprising:

a tubular sleeve member made of resiliently deformable elastomeric material and having an inner circumferential surface adapted to be fitted onto a shaft member;

an annular projection formed integrally on a small portion of said inner circumferential surface of said tubular sleeve member; and an endless band made of relatively rigid material which has a uniform cross sectional shape over its entire circumferential length, said endless band being disposed with a small portion of said tubular sleeve member and said band coaxially surrounding said annular projection such that said small portion is disposed between the band and the projection;

an inner diameter of said annular projection being slightly smaller than an outer diameter of a portion of the shaft member engaged by said annular projection when said tubular sleeve member is mounted on the shaft member, and an inner diameter of said endless band being slightly larger than said outer diameter of said portion of the shaft member.

2. A mounting arrangement according to claim 1, wherein an inner diameter of said tubular sleeve member is substantially equal to said outer diameter of the shaft member except at said annular projection.

3. A mounting arrangement according to claim 1, wherein said tubular sleeve member is connected to an annular mass member which coaxially surrounds said sleeve member, via a radial rib made of resilient elastomeric material.

4. A mounting arrangement according to claim 1, wherein said endless band is insert molded in said tubular sleeve member.

5. A mounting arrangement according to claim 1, wherein at least one of axial ends of said annular projection is provided with a tapered section.

6. A mounting arrangement according to claim 1, wherein said tubular sleeve member consists of a dust boot made of elastomeric material with one axial end thereof shaped to be fitted on the shaft member, said annular projection is formed in the axial end of the dust boot, and said endless band is disposed with the axial end of the dust boot and said band surrounds the annular projection such that said axial end is disposed between the band and the projection.

7. A mounting arrangement according to claim 1, wherein said tubular sleeve member has an annular groove defined in an outer circumferential surface thereof, said endless band being disposed in said annular groove.

8. A mounting arrangement as defined in claim 1, wherein said endless band is rotationally balanced.

9. A mounting arrangement as defined in claim 1, wherein said endless band and said tubular sleeve member as disposed together are adapted to be simultaneously fitted onto the shaft such that said band compressingly fixes said annular projection in engagement with the shaft.

10. A mounting arrangement as defined in claim 1, wherein said annular projection is adapted to be held in compressive engagement with a small portion of the shaft by said endless band as a sole means for fixing the tubular sleeve member to the shaft.

11. An elastomeric tubular device for being mounted on a shaft member, comprising:

a tubular sleeve member made of resiliently deformable elastomeric material and having an inner circumferential surface adapted to be fitted onto a shaft member;

an annular projection extending inwardly and integrally from said inner circumferential surface of said tubular sleeve member; and an endless band made of relatively rigid material which has a uniform cross sectional shape over its entire circumferential length and disposed about said tubular sleeve member such that a portion of said tubular sleeve member is disposed coaxially between the endless band and said annular projection;

an inner diameter of said annular projection being slightly smaller than an outer diameter of a portion of the shaft member engaged by said annular projection when said tubular sleeve member is mounted on the shaft member, and an inner diameter of said endless band being slightly larger than said outer diameter of said portion of the shaft member.

12. An elastomeric tubular device according to claim 11, wherein said endless band compresses said annular projection against the shaft member when the tubular device is mounted onto the shaft member such that the tubular sleeve member is prevented from moving in both axial and circumferential directions relative to the shaft member.

13. An elastomeric tubular device according to claim 11, wherein an inner diameter of said tubular sleeve member is substantially equal to said outer diameter of the shaft member except at said annular projection.

14. An elastomeric tubular device according to claim 11, wherein said endless band is insert molded in the tubular sleeve member.

15. An elastomeric tubular device according to claim 11, wherein said tubular sleeve member is formed with an axial extension and said endless band is adapted to be fitted onto said axial extension.

16. An elastomeric tubular device according to claim 15, wherein said tubular sleeve member including said axial extension is provided with an inner circumferential surface having a uniform inner diameter, said endless band has a slightly smaller inner diameter than an outer diameter of said axial extension, and said annular projection is formed by fitting said endless band onto said axial extension.

17. An elastemeric tubular device according to claim 15, wherein said axial extension of said tubular sleeve member has at least one axial slit defined therein to facilitate placement of said endless band onto said axial extension.

18. An elastomeric tubular device according to claim 11, wherein at least one of axial ends of said annular projection is tapered to facilitate fitting the tubular sleeve member onto the shaft member.

19. An elastomeric tubular device according to claim 11, wherein said endless band is rotationally balanced.

20. An arrangement for mounting a tubular member made of elastomeric material onto a rotatable shaft member such that the tubular member is prevented from moving in radial and axial directions relative to the shaft member, the arrangement comprising:

a tubular sleeve member made of resiliently deformable elastomeric material and having an inner circumferential surface adapted to be fitted onto a shaft member;

an annular projection formed integrally on a small portion of said inner circumferential surface of said tubular sleeve member; and an endless band made of relatively rigid material which has a uniform cross sectional shape over its entire circumferential length, said endless band being disposed with a small portion of said tubular sleeve member and said band coaxially surrounding said annular projection such that said small portion is disposed between the band and the projection;

an inner diameter of said annular projection being slightly smaller than an outer diameter of the shaft member, and an inner diameter of said endless band being slightly larger than said outer diameter of the shaft member; and said annular projection is formed in an axial extension of said tubular sleeve member, and said endless band is adapted to be fitted onto said axial extension.

21. A mounting arrangement according to claim 20, wherein said axial extension of said tubular sleeve member is provided with at least one axial slit to facilitate placement of said endless band onto said axial extension.

22. A mounting arrangement according to claim 20, wherein said tubular sleeve member including said axial extension is provided with an inner circumferential surface having a uniform inner diameter, and said annular projection is formed by fitting said endless band having a slightly smaller inner diameter than an outer diameter of said axial extension onto said axial extension.

23. An elastomeric tubular device for being mounted on a shaft member, the device comprising:

a tubular sleeve member made of resiliently deformable elastomeric material and having an inner circumferential surface adapted to be compressively fitted onto a shaft member; and an endless band made of relatively rigid material molded within said tubular sleeve member so as to coaxially surround a portion of said tubular sleeve member defining said inner circumferential surface;

said inner circumferential surface of the tubular sleeve member having a diameter slightly smaller than an outer diameter of the shaft member, and the endless band having an inner diameter slightly larger than said outer diameter of the shaft member such that said endless band compresses said portion of the tubular sleeve member when the tubular sleeve member is compressively fitted onto the shaft member for thereby preventing the tubular member from moving in radial and axial directions relative to the shaft member.

24. An elastomeric tubular device according to claim 23, wherein at least one axial end of said inner circumferential surface is tapered to facilitate fitting the tubular sleeve member onto the shaft member.

* * * * *

UNITED STATES PATENT AND TRADEMARK OFFICE
CERTIFICATE OF CORRECTION

PATENT NO. : 6,485,370 B1
DATED : November 26, 2002
INVENTOR(S) : Norikazu Kurosu It is certified that error appears in the above-identified patent and that said Letters Patent is hereby corrected as shown below:

Title page,
Item [56], References Cited, U.S. PATENT DOCUMENTS, change "Okyama" to -- Okuyama --; change "Hammada et al." to -- Hamada et al. --.

Column 1,
Line 31, after "ends" insert -- of --.

Column 3,
Line 36, change "potion" to -- member --.

Column 4,
Line 12, change "potion" to -- member --.
Line 38, change "potion" to -- member --.
Line 62, change "potion" to -- member --.

Column 7,
Line 38, change "elastemeric" to -- elastomeric --.

Signed and Sealed this

Twentieth Day of May, 2003

JAMES E. ROGAN
*Director of the United States Patent and Trademark Office*